United States Patent [19]

Franklin

[11] Patent Number: 4,798,056
[45] Date of Patent: Jan. 17, 1989

[54] DIRECT EXPANSION SOLAR COLLECTOR-HEAT PUMP SYSTEM

[75] Inventor: James L. Franklin, Richland, Wash.

[73] Assignee: Sigma Research, Inc., Redmond, Wash.

[21] Appl. No.: 450,326

[22] Filed: Dec. 16, 1982

Related U.S. Application Data

[60] Division of Ser. No. 120,227, Feb. 11, 1980, Pat. No. 4,392,359, which is a continuation of Ser. No. 857,569, Dec. 5, 1977, abandoned.

[51] Int. Cl.⁴ ............................................. F25B 27/00
[52] U.S. Cl. .................................. 62/235.1; 237/2 B; 62/238.6
[58] Field of Search .................... 62/235.1, 324.4, 238, 62/6; 165/29; 237/2 B; 126/446, 447, 427, 451, 433, 438

[56] References Cited

U.S. PATENT DOCUMENTS

| | | | |
|---|---|---|---|
| 2,594,232 | 4/1952 | Stockstill | 126/446 |
| 4,065,938 | 1/1978 | Jonsson | 62/235.1 |
| 4,130,107 | 12/1978 | Rabl et al. | 126/438 |
| 4,142,510 | 3/1979 | Hare et al. | 126/438 |

Primary Examiner—Henry A. Bennet
Attorney, Agent, or Firm—Robert Keith Sharp

[57] ABSTRACT

A solar collector-heat pump heating system which comprises metallic plates which are directly exposed to the ambient atmosphere and which are in direct heat exchange relation with tubes. A compressor receives a heated low-boiling working fluid, e.g., R-22, from the tubes as a vapor, compresses it and delivers it to a condenser. The fluid then passes through a throttling valve where it partially vaporizes, then to the tubes, where vaporization continues, utilizing heat absorbed by the plates from solar radiation, the ambient air, rain, and long-wave infrared radiation. Heat is extracted from the condenser and used for space heating. Preferably, heat storage means, e.g., a tank of water or a body of low-melting salt, are provided. Preferably, the heat-absorbing plates are long and narrow. In one embodiment they are spaced from a diffuse reflective backing and are laterally spaced from each other. In another embodiment they form a siding for a building. When heat storage is provided, the system can also serve for cooling by reversing the flow of the working fluid and rejecting heat through the plates at night.

5 Claims, 3 Drawing Sheets

DIRECT EXPANSION SOLAR COLLECTOR-HEAT PUMP SYSTEM

This is a division of application Ser. No. 120,227 filed Feb. 11, 1980, now U.S. Pat. No. 4,392,359, which is a continuation of application Ser. No. 857,569 filed Dec. 5, 1977 now abandoned.

BACKGROUND

The use of solar energy has received a great deal of attention, particularly in connection with space heating. For this purpose the "flat plate" solar collector has been the preferred type. In the typical embodiment, this comprises a shallow box, covered with glass or other transparent material. Within the box are pipes carrying water, usually with an antifreeze additive. Frequently the pipes are attached to metal plates to increase the absorbent surface. The bottom and sides of the box are insulated. The water is used to supply heat directly to the space to be heated.

Heat pumps are also well known for space heating. Typically, they involve a condenser within the building to be heated and an evaporator exposed to the ambient air, though there have been systems in which the evaporator absorbed heat from ground water.

In many areas of the United States, solar heaters have not been an attractive source of residential energy due to the high capital cost of the flat plate collectors required to supply a significant amount of heat during the winter.

Attempts have been made to combine the solar heater with a heat pump to enhance the efficiencies of both. These have been centered on the use of conventional flat plate collectors coupled, by means of a heat exchanger, to the evaporator of the heat pump. This permits the collection system of the solar collector to operate at a lower temperature and the evaporator of the heat pump to operate at a higher temperature than would otherwise be the case. Although efficiencies did rise with this type of system, the installed cost of the solar collectors prevented significant increases in return of investment from being achieved.

A variation of the systems just mentioned is disclosed in U.S. Pat. No. 2,529,154 to E. H. Hammond et al. In the system disclosed by the patent, water or an aqueous solution is circulated through a solar collector mounted in a rooftop and serves to heat the earth or a pool of water. A heat pump system absorbs heat from the water or earth and delivers it to a house.

U.S. Pat. No. 1,765,136 to C. H. Drane, Jr., shows a steam generator involving a solar collector and a heat pump. Ammonia is evaporated in a solar collector. The vapor is compressed and is condensed in a heating coil located in a steam boiler. The solar collector is of the conventional, flat plate, insulated box type operating generally above ambient temperature.

U.S. Pat. No. 3,262,493 to D. E. Hervey shows a system including a solar heat exchanger "adapted to selectively, in the alternate, collect heat and dissipate cold or collect cold and dissipate heat". It consists of a series of flattened tubes each mounted in a semi-cylindrical reflector so that the tubes receive both direct and reflected sunlight. The reflectors appear to be of the specular type. The tubes appear to be exposed to the atmosphere. No heat pump is included. Heat absorbed in the collector by circulating fluid is stored in, and later extracted from, the soil.

U.S. Pat. No. 3,991,938 to Harry Borders Ramey shows a system in which a plate on the ridge of house is sprayed with water and is cooled by the evaporator of a heat pump. The temperature of the plate is kept low enough to freeze the water, thus extracting heat. The heat pump is reversed at intervals, allowing the ice to slide down under a transparent cover, where it is melted and warmed by solar heat. The warmed water is first used to warm the house, then to cool the condenser of the heat pump, absorbing heat, again used to heat the house, then returned to the ridge plate.

U.S. Pat. No. 4,002,160 to George R. Mather shows a solar heat collector including a diffuse reflecting surface and a series of blackened collector tubes spaced from the reflecting surface and from each other. Each blackened tube is surrounded by a clear tube and the space betwen them is evacuated, so that the blackened tubes are insulated from the surrounding air. No heat pump is utilized.

SUMMARY OF THE INVENTION

My invention involves a direct expansion solar collector/heat pump system. Unlike conventional pumped water flat plate collectors, it does not utilize insulation or cover glass. Instead, the collectors are simple, exposed metal plates attached to or integral with tubes carrying the working fluid of the heat pump. The working fluid flows directly through the panel tubes and absorbs the collected solar energy during the evaporation stage of the heat pump cycle. Preferably, the working fluid is below ambient temperature so that additional heat is absorbed from the air by convection and from the surroundings by infrared radiation.

The collected energy is stored as latent heat in the vaporized working fluid. To develop usable heat, the working fluid vapor is compressed, raising its temperature and pressure. It is then condensed in an indoor heat exchanger, giving up its latent heat, either directly to the air or to water, which may be stored in its heated condition, or to other heat absorbing media, e.g., low-melting salts which undergo phase changes.

The invention involves a combined solar collector-heat pump heating system comprising at least one metallic surface member exposed directly to the ambient atmosphere and positioned to directly receive solar radiation, conduit means for fluid in direct exchange relation with said metallic surface member, a compressor, an inlet line connecting a first end of said conduit means with the suction side of said compressor, a condenser, means for extracting heat from said condenser, an outlet line connecting the high-pressure side of said compressor with a first end of said condenser, a return line connecting a second end of said condenser with a second end of said conduit means, a restriction means in said return line, and a working fluid filling said conduit means, inlet line, compressor, outlet line, condenser, and return line, said working fluid having a boiling point such that it is vaporized in said conduit means and condensed in said condenser.

The use of heat storage is advantageous in that it enables the system to supply adequate heat during the night, when it is, of course, inoperative as a solar collector and functions only as a heat pump collecting energy from ambient air with a greatly reduced efficiency. The use of stored water also makes it possible to reverse the heat pump during the summer months, rejecting heat from the water during the night of the working fluid and then through the plates by convection (free or wind-aided) and by radiation to the night sky. The chilled water can then be used for air conditioning during the night or day.

In a preferred construction, the solar absorber is a panel made up of long, narrow metal plates, each of which is soldered to or integral with a tube extending the length of the plate. These plates are laterally spaced apart and are also spaced above a generally flat reflective backing, which may be a roof. The spacing in each direction is similar to the width of a plate. The plates and tubes are coated with a high absorptivity material, e.g., black paint, while the backing is coated with a low absorptivity material, e.g., white paint. The plates are inclined to the horizontal at an angle which will vary according to the latitude of the installation and atmospheric conditions. Heat is absorbed on the front of the plates by radiation received directly from the sun and sky, and on the rear from radiation reflected by the backing. It is also absorbed from the air, which circulates freely over the plates, and from falling rain. Since the plates are not behind glass, they also absorb long-wave-length infrared radiation emitted by the surroundings.

DETAILED DESCRIPTION

Figure 1:
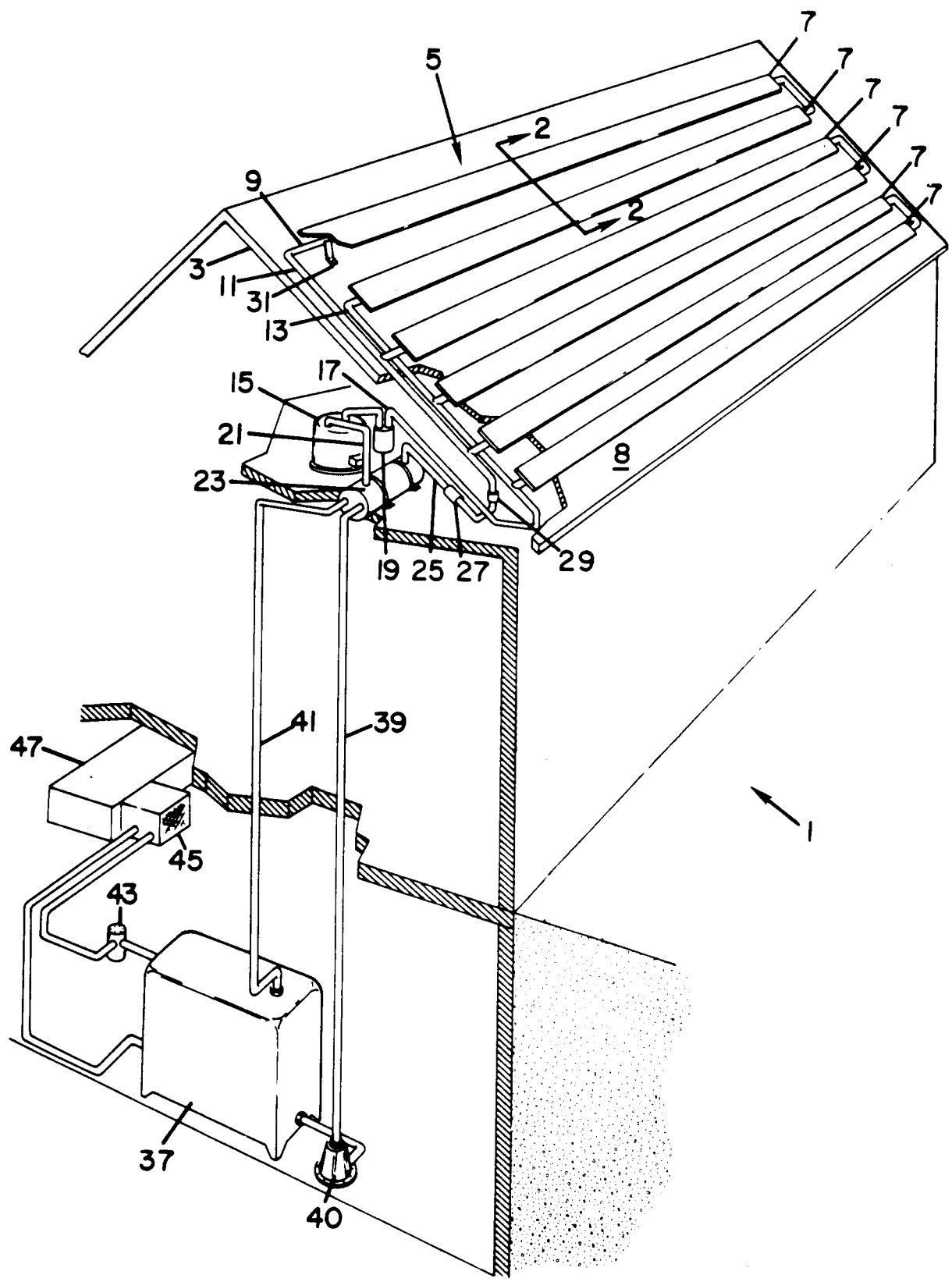
FIG. 1 is a perspective view of a building including a diagramatic illustration of my heating system.

In FIG. 1 I show diagramatically a preferred form of heating system involving my invention.

A building 1 has a sloping roof 3 on which the solar panel 5 is mounted. The solar panel 5 is made up of long, narrow, flat laterally spaced plates 7 spaced from each other and from a reflective backing 8 on roof 3. Metal tubing 9 extends longitudinally along the underside of each plate 7. Tubing 9 is joined to an inlet header 11 and an outlet header 13.

Within the building is a compressor 15. An inlet line 17 including liquid trap 19 connects outlet header 13 of the solar panel to the low-pressure or suction side of compressor 15. An outlet line 21 leads from the high-pressure side of compressor 15 to condenser 23. A return line 25 which includes a filter-dryer 27 leads to inlet header 11 of solar panel 5. Just ahead of header 11 is an expansion of throttling valve 29.

The circuit made up of tubing 9, inlet line 17, compressor 15, outlet line 21, condenser 23 and return line 25 is filled with a low-boiling working fluid, such as is employed in conventional heat pump systems, e.g., R-22 (monochloro difluoromethane) which has a boiling point (760 mm Hg) of −41° C. The liquid trap 19, compressor 15, condenser 23, filter-dryer 27 and expansion valve 29 may be conventional heat pump components. Heat may be extracted from condenser 23 by air or water and used directly to heat building 1. I prefer, however, to provide a heat storage system as will be described.

Figure 2:
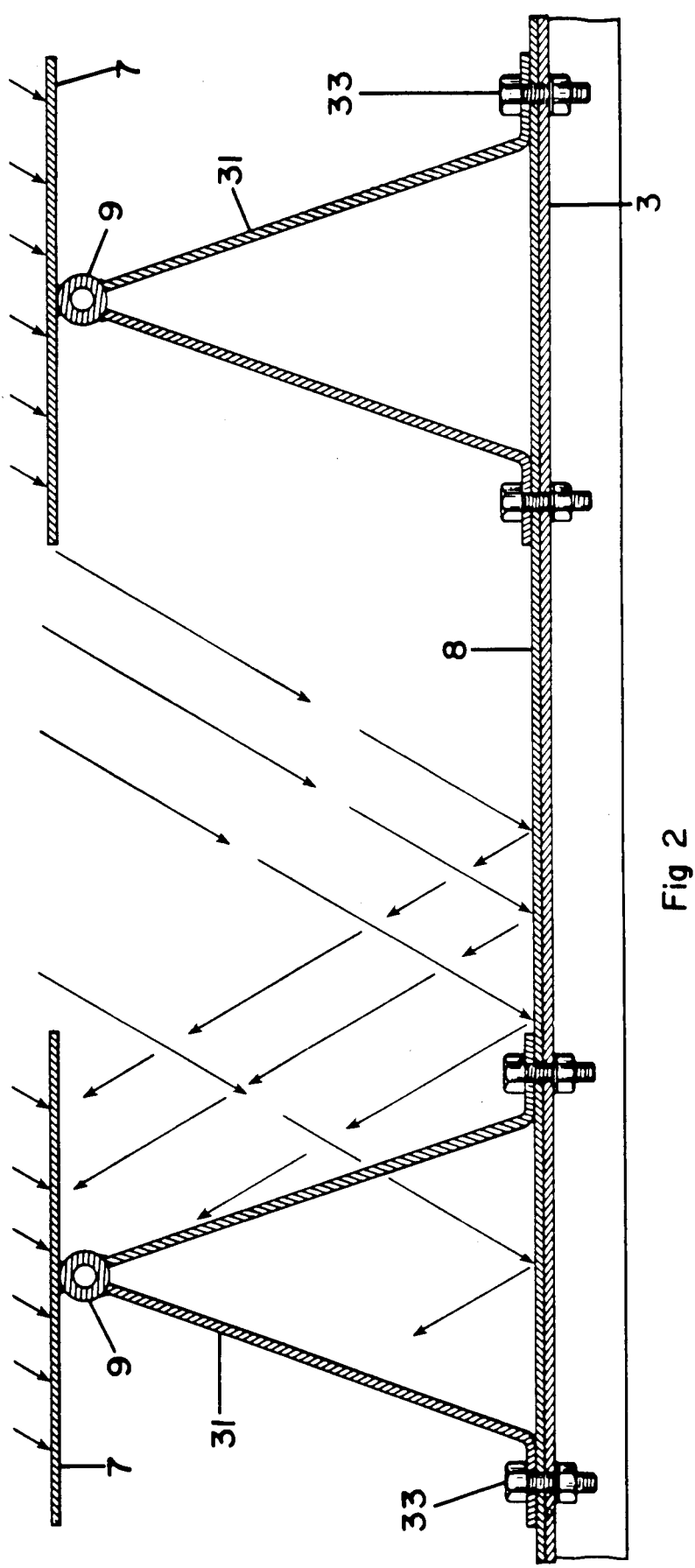
FIG. 2 is a partial sectional view of one form of solar panel showing the manner of irradiation, taken on the line 2—2 in FIG. 1.

Returning now to the solar panel 5, it will be seen from FIGS. 1 and 2 that the narrow, elongated plates 7 are spaced from each other and from roof 3 by distances which are about the same as the widths of the plates. They are supported on steel legs 31 which are welded to steel tubes 9. Plates 7 are preferably made of copper, soldered to tubes 9. Legs 31 are inclined to each other in a direction lateral to the plates, so as to form an inverted V. They are secured to roof 3 by bolts 33. Legs 31 are made narrow, e.g., 25 mm wide, in a direction longitudinal of the plates 7, and are widely spaced, e.g., 1.5 m, so that the undersides of the plates are largely unobstructed. It will be noted that the tubes 9 have lateral dimensions much smaller than the widths of plates 7. The heat exchange with the boiling fluid in tubes 9 is so good that only one such tube 9 is required per plate 7.

Instead of tubes 9 being separate from, but secured to, plates 7, they can be made integral by making plates 7 of two sheets "roll-bonded" together with parts separated to form tubes or channels. This arrangement is common in refrigerators. Further, tubes 9 and plates 7 can be made integral in an extrusion process, generally utilizing aluminum.

From the connections between inlet header 11, tubes 9, and outlet header 13, it will be seen that the plates 7 are connected in pairs such that the flow of boiling fluid in the tubes is horizontally and downwardly, by gravity. This avoids problems of "vapor lock" and oil entrapment.

Roof 3 includes a backing sheet 8, the top surface of which has a diffuse reflective surface, e.g., a white paint having a solar absorptivity of 0.23, while the plates 7, tubes 9, and legs 31 have highly absorptive surfaces, e.g., a black paint having a solar absorptivity of 0.92.

On FIG. 2, the small arrows show the irradiation of plates 7. It will be noted that the plates receive direct radiation from the sun and sky on their top surfaces and reflected radiation on their bottom surfaces. Reflected radiation is also received directly on tubes 9. As has been stated, legs 31 are narrow and spaced apart longitudinally of plates 7, so as to give a minimum of obstruction to the reflected radiation. They also absorb some reflected radiation and transmit it to tubes 9.

Because of the spacing of plates 7 and legs 31, plates 7 and tubes 9 also act as a finned heat exchanger. Since the tubes 9 form the evaporator of a heat pump system using a low-boiling working fluid, they can be, and preferably are, operated at a temperature below that of the ambient.

The structure is such that the air circulates freely around the plates and tubes, giving up heat to the working fluid. It has also been found that the splashing of raindrops on the plates 7 produces excellent heat exchange, supplying heat when solar radiation is much reduced. Moreover, since the plates 7 are not behind glass, they receive long-wave infrared radiation from surrounding structures. This is in contrast to the usual flat plate collectors, operating at temperatures considerably above ambient, which utilize cover glass to prevent the escape of this long-wave radiation.

I have found it possible with this system to obtain a collection efficiency of 67%, i.e., a heat output of the panel equal to 67% of the solar radiation received on the total area covered by the panel. (This includes the area covered by the plates and the exposed area between them.) This is considerably higher than many conventional flat plate collectors.

As stated earlier, I prefer to include a heat storage system, which makes it possible to store heat during the day and utilize it at night. One such system is illustrated in FIG. 1. A tank of water 37 is located in the basement of house 1. Cold water line 39 provided with a pump 40 leads from the bottom of tank 37 to condenser 23 where it absorbs heat from the working fluid while hot water line 41 leads from condenser 23 to the top of tank 37. Pump 43 circulates water from tank 37 through water-to-air heat exchanger 45 which supplies heated air to hot air heating duct 47.

To provide for cooling when desired, rather than heating, the direction of flow of the working fluid would be reversed by means commonly employed in conventional heat pump heating-cooling systems. By operating the system during the night the plates 7 would act as condensers and condenser 23 as an evaporator for working fluid, cooling the water in tank 37. Pump 43 would then be run in reverse, withdrawing chilled water from the bottom of tank 37, circulating it through water-to-air heat exchanger 45 and back to the upper portion of tank 37, cooling the air.

Figure 3:
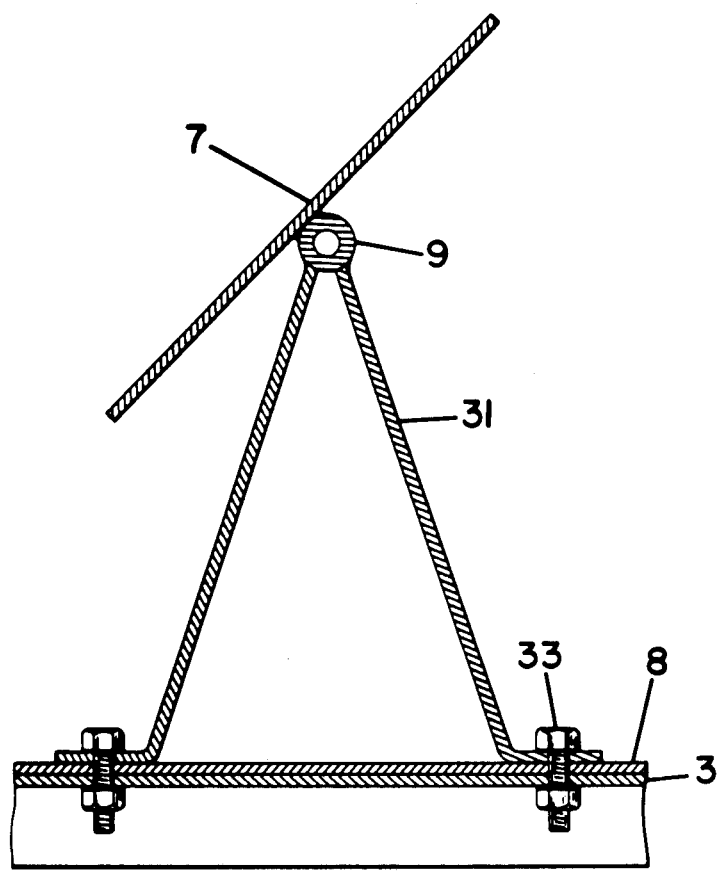
FIG. 3 is a partial sectional view of a second form of solar panel.

The solar panel 5 may take forms other than that shown in FIGS. 1 and 2. In FIG. 3 I show a modification particularly adapted for use on flat roofs. In this modification the reflective backing 8 is horizontal while plates 7 are tilted at the optimum angle to receive radiation. They are spaced from each other enough to prevent significant mutual shading.

Figure 4:
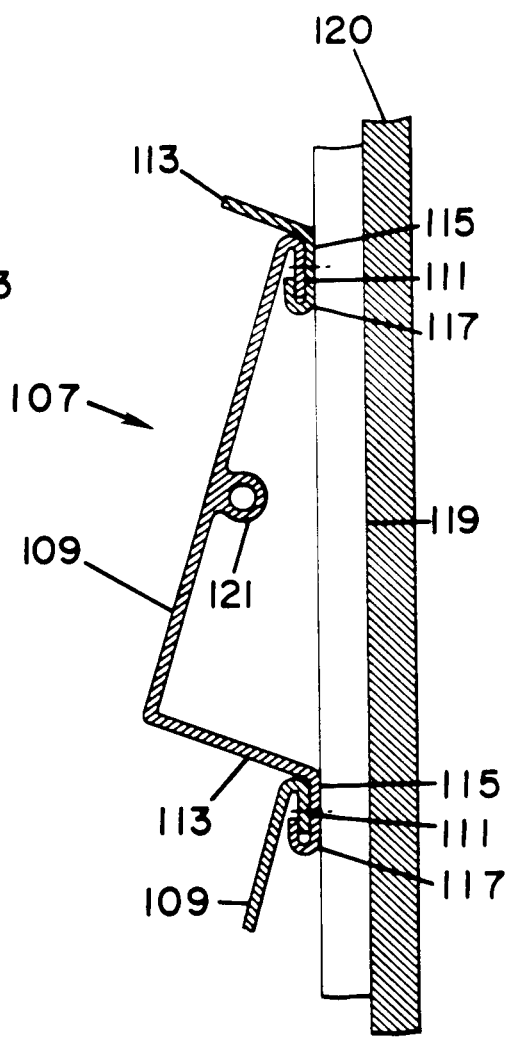
FIG. 4 is a partial sectional view of a third form of solar panel.

Still another form is shown in FIG. 4, this modification being adapted for use in latitudes corresponding to northern states of the United States in localities having a large proportion of clear days. Under those conditions the surfaces of the collecting plates can be almost or completely vertical. FIG. 4 shows a form of panel made to simulate siding and thus form an attractive surface for the exterior wall of a house. Each plate 107 has a main surface member 109 which terminates at its upper edge in an acutely angled reverse flange 111 and at its lower end in an obtusely angled flange 113. The latter is bent to form a footpiece 115, which terminates in a hook 117. Flange 111 and footpiece 115 lie in a common plane. As illustrated, each footpiece is nailed to stand-off strips 119 or other structural members of the building, while flanges 111 are inserted in hooks 117, locking the plates together. Stand-off strips 119 are attached to sheathing 120 to permit the free drain-off of condensate forming on the back of the plates 107.

Plates 107, like plates 7, are long and narrow and are provided with tubes 121 which extend from end to end of the plates.

I have found that various brown and green paints give a solar absorptivity close to flat black, thus indicating that the collector "siding" can be painted with a number of common house coating and still be quite effective in absorbing heat. This effectively eliminates problems in achieving good esthetics with contemporary structures.

The angle of inclination of surface member 109 can be varied and, since a vertical surface is near optimum in the situation for which the modification of FIG. 4 is intended, the narrow plates 107 can be replaced by broader, flat plates, each carrying several spaced, parallel tubes.

The modification of FIG. 4 is incorporated in the same system and operates in the same manner as that of FIGS. 1 and 2, except that it does not utilize radiation reflected from the rear.

In contrast to the situation just discussed, where a vertical position of the heat collecting plates is near optimum, there are situations in which a horizontal position of the plates and the panel as a whole is desirable. This is the case in those climates where the radiation is larger diffuse, e.g., cloudy coastal areas. In such a case, the preferred structure may be that of FIG. 2 mounted on a flat roof.

It will be noted that in each of the modifications, the panel, which in FIGS. 1, 2 and 3 includes reflective surface member 8, occupies substantially all of a major surface of a building—a roof surface in the case of FIGS. 1, 2 and 3 and a wall in the case of FIG. 4.

The optimum operating temperature of the collecting plates also depends on the climatic conditions. The farther below ambient, the greater will be the heat absorbed from the air. However, the temperature should not be so low as to produce frost. Severe frosting will almost destroy the absorptivity for radiation. The frost point will depend on the atmospheric humidity. For relatively dry conditions (temp. 0° C., 50% relative humidity) it will be about −9° C., while for near 100% humidity it will be only slightly below 0° C.

The optimum position of the collecting plate is a function of the latitude and the prevalent atmospheric conditions. For direct solar radiation, the higher the latitude the greater should be the angle with the horizontal. For a given latitude, the more diffused the sunlight, the less that angle should be. The selection in a given case involves a balance of these effects.

The working fluid may be any one of the various low-boiling liquids used in conventional heat pump and refrigeration systems. The following are examples of suitable substances.

| Industrial name | Chemical formula | Boiling point °C. at 760 mm |
|---|---|---|
| R-12 | $CCl_2F_2$ | −30 |
| R-22 | $CHClF_2$ | −41 |
| R-114 | $C_2Cl_2F_4$ | 3 |
| Ammonia | $NH_3$ | −33 |
| Sulfur dioxide | $SO_2$ | −10 |

SPECIFIC EXAMPLE

A unit of the type shown in FIGS. 1 and 2 has an outside panel area of 37.2 m$^2$ (400 ft.$^2$). The individual plates are 152 mm (6 in.) wide, spaced the same amount from a reflective backing. The plates are painted with a flat black paint, solar absorptivity 0.92, and the backing with a flat white paint, solar absorptivity 0.23.

Under conditions typical of a winter day at Richland, Washington, (latitude 46.5° N, altitude 125 m, east of the Cascade Mountains) the average ambient temperature is 4.3° C., the total incident solar flux density is about 384 W/m$^2$. Under these conditions the output termperature of the unit is 35.6° C. and 136 KWhr. of useful space heat are produced per day. The average coefficient of performance, i.e., the ratio of heat output to electric input is 3.55. That is to say, the consumption of electricity is 38.3 KWhr. This supplies ample heat for a 186 m$^2$ (2,000 ft.$^2$) house having the thorough insulation typical of buildings designed for solar heating.

The embodiments of the invention in which a proprietary right or privilege is claimed are defined as follows:

1. A combined solar collector-heat pump system comprising a heat absorbing panel, said panel comprising a single generally flat reflective surface member and a plurality of long, narrow, generally flat metallic plates, of substantially the same widths, said plates being generally parallel to each other and being laterally spaced apart and spaced from said reflective surface member by distances which are of the same order of magnitude as the widths of said plates, said metallic plates being directly exposed to the ambient atmosphere, each of said plates having a front face directly exposed to solar radiation and a rear face positioned to receive solar radiation reflected from said reflective surface member, both said faces being highly absorptive of solar radiation and said reflective member having an absorptivity for solar radiation which is low compared to that of said plates, conduit means for fluid in direct heat exchange relation with each of said metal plates, a compressor, an inlet line connecting a first end of each of said conduit means with the suction side of said compressor, a condenser, means from extracting heat from said condenser, an outlet line connecting the high pressure side of said compressor with a first end of said condenser, said inlet line serving to transfer the heat absorbed by said metal plates and fluid in the conduit means to the suction side of said compressor, and said outlet line serving to transfer the absorbed heat and the heat of compression to the first end of said condenser, a return line connecting the second end of said condenser with the second end of said conduit means, a restriction means in said return line, and a working fluid filling said conduit means, inlet line, compressor, outlet line, condenser and return line, said working fluid having a boiling point such that it is vaporized in said conduit means and condensed in said condenser, said working fluid being the only solar-heat-absorbing fluid in said system.

2. A system as defined in claim 1 wherein said conduit means comprises at least one metal tube extending longitudinally substantially the full length of, and in direct heat exchange with, each of said plates, said tubes having lateral dimensions much smaller than said plates and said reflective surface member having a diffuse reflective surface.

3. A system as defined in claim 2 wherein said reflective surface member is inclined to the horizontal, said plates extend longitudinally substantially horizontally and said tubes are so connected that said fluid flows downwardly from plate to plate under the influence of gravity.

4. A system as defined in claim 1 wherein said reflective backing is substantially flat and has a diffuse reflective surface and said plates are substantially parallel to said reflective backing.

5. A system as defined in claim 1 wherein said reflective backing is substantially flat and has a diffuse reflective surface and said plates are parallel with each other but are at an angle to said reflective backing.

* * * * *